United States Patent [19]

Delahunty

[11] 3,836,377

[45] Sept. 17, 1974

[54] CYANOACRYLATE ADHESIVE COMPOSITION

[76] Inventor: John J. Delahunty, 18 Chalfont Estate, Texas Ln., Malahide Co., Dublin, Ireland

[22] Filed: Dec. 7, 1972

[21] Appl. No.: 313,061

[30] Foreign Application Priority Data
Dec. 14, 1971  Ireland.............................. 1584/71

[52] U.S. Cl.......... 106/287, 260/33.4 R, 260/33.64, 260/78.4 N
[51] Int. Cl. ............................................. C08f 3/42
[58] Field of Search..... 260/78.4 N, 33.4 R, 33.6 U, 260/33.8 U; 106/287

[56] References Cited
UNITED STATES PATENTS
2,765,332   10/1956   Coover .............................. 260/464
3,260,637   7/1966   Bramer ....................... 260/78.4 N X
3,640,972   2/1972   Bolger............................ 260/78.4 N Primary Examiner—Morris Liebman
Assistant Examiner—Richard Zaitlen
Attorney, Agent, or Firm—J. Rodney Reck, Esquire; Jean B. Mavro, Esquire

[57] ABSTRACT

This invention concerns polymerization accelerators or surface activators for increasing the rate of cure of cyanoacrylate adhesive compositions. The active ingredients of the activators are organic compounds containing a

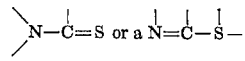

group.

12 Claims, No Drawings

CYANOACRYLATE ADHESIVE COMPOSITION

BACKGROUND OF THE INVENTION

This invention relates to improved methods of forming adhesive bonds with adhesive compositions containing organic cyanoacrylates, and to compositions for use in such methods. Certain known organic compounds have been discovered to accelerate polymerization in such adhesive compositions, even when used as primers or surface activators, and thus to assist in rapid adhesive bond formation.

Adhesive compositions comprising one or more esters of 2-cyanoacrylic acid (hereinafter "cyanoacrylate esters") are known to have excellent utility in bonding pairs of juxtaposed surfaces or substrates. Rapid setting (e.g., within several minutes, and frequently within a matter of 15 seconds or less) to form adhesive bonds is a desirable, and frequently essential, property of such compositions. It is this ability to rapidly and dependably bond a wide variety of substrates that has rendered cyanoacrylate ester adhesives an extremely popular product in today's homes and industries.

Cyanoacrylate ester adhesive compositions, however, are affected substantially by certain surfaces or by common contaminants in or on many surfaces, and the bonding speed or durability is frequently adversely affected thereby. As a result, it has become necessary in some cases, and a desirable precaution in other cases, to use polymerization accelerators in conjunction with the cyanoacrylate ester adhesives to accelerate bond formation. Some polymerization accelerators may be incorporated in cyanoacrylate adhesive compositions, but more commonly they are coated on one or both substrates as a primer or surface activator before application of the cyanoacrylate ester adhesive. See, for example, U.S. Pat. No. 3,640,972 of O'Sullivan and Bolger, issued Feb. 8, 1972.

Some disadvantages of the polymerization accelerator techniques of the prior art have included unsatisfactorily low ultimate bond strengths and failure to form firm bonds at all when one or both substrates is, e.g., wood (including plywood) or a phenolic resin. Many factors certainly contribute to the difficulties experienced with certain substrates, but one significant factor is thought to be the slightly acid nature of certain surfaces since cyanoacrylate ester adhesive cure is anionically initiated.

Prior art polymerization accelerator techniques have had certain disadvantages, which has led to a continuing demand for a more fully acceptable accelerator product. Typical examples of prior art patents are U.S. Pat. No. 2,768,109 to Coover, issued Oct. 23, 1956, which discloses a method for improving the adhesive efficiency of cyanoacrylate ester adhesives by treating the substrate with an aliphatic monohydric alcohol prior to the application of the adhesive composition; and U.S. Pat. No. 3,259,534 to Wicker and Shearer, issued July 5, 1966, which describes the treatment of surfaces to be bonded with a monomeric epoxide prior to application of the adhesive composition. Satisfactory results are not always obtainable with the use of these compositions and techniques. The ultimate strength of bonds formed with their use was often substantially lower than that of bonds formed between metallic or other non-acidic surfaces using cyanoacrylate ester adhesives without accelerator pretreatment. Further, even bonds between metal or other non-acidic substrates frequently are noticeably lower in ultimate strength when the polymerization accelerator pretreatment is used, when compared to comparable bonds between such substrates without pretreatment.

THE INVENTION

It is an object of the present invention to provide compositions and methods involving cyanoacrylate ester adhesives wherein rapid bonds of satisfactory ultimate strength are formed between a wide variety of substrates, as well as under a variety of bonding conditions.

More specifically, the invention concerns adhesive compositions containing polymerizable cyanoacrylate esters and a polymerization accelerator for use therewith, such polymerization accelerator comprising an organic compound containing a

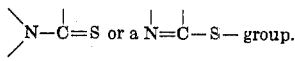

The invention includes the incorporation of the above-described polymerization accelerator directly into the cyanoacrylate ester adhesive at the time of use but, more commonly, the polymerization accelerator is applied to one or both of the substrates to be bonded, followed by direct application to one or both of said substrates of the cyanoacrylate ester adhesive. Thereafter, the substrates are placed in the juxtaposed relationship until the adhesive has hardened therebetween.

In addition, the invention concerns the process for bonding substrates which involves the above-described compositions, wherein the polymerization accelerator is used as a direct additive to the cyanoacrylate ester adhesive, or, more commonly, as a surface primer as described above.

DISCUSSION OF THE INVENTION AND ITS PREFERRED EMBODIMENTS

The benefits of this invention are achievable with essentially all adhesive compositions based upon cyanoacrylate esters. Most commonly, the esters have the formula

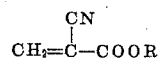

wherein R represents a $C_{1-16}$ alkyl, cycloalkyl, alkenyl, cycloalkenyl, phenyl or heterocyclic (such as furfuryl) radical. Naturally, the above R group can contain any linkages or substituents which do not adversely affect the monomer in the performance of its intended function in the cyanoacrylate adhesive compositions, such as strongly basic substituents which may adversely affect the stability of the adhesive composition. For purposes of this invention, the preferred monomers are those wherein R is a cyclohexyl or a $C_1$ to $C_6$ alkyl, or alkenyl radical. The esters may be used singly or in admixture.

The above monomeric esters of 2-cyanoacrylic acid can be prepared by methods known in the art, such as those described in U.S. Pat. Nos. 2,467,927 to Ardis, issued Apr. 9, 1949 and 3,254,111 to Hawkins et al., issued May 31, 1966.

Cyanoacrylate ester adhesive compositions generally contain an anionic inhibitor, e.g., an acidic substance, soluble in the ester of 2-cyanoacrylic acid, which inhibits anionic polymerization. The specific inhibitor chosen is not critical to this invention, and a number of suitable inhibitors of anionic polymerization are well known in the art.

The best known are the soluble acidic gases such as sulfur dioxide, sulfur trioxide, nitric oxide, and hydrogen fluoride. More recently, organic sultone inhibitors have been developed, the sultone being generally represented by the formula

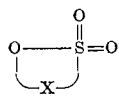

wherein X is an organic radical joining the —S(O$_2$)O— group in a 4, 5, or 6 member heterocyclic ring, preferably a 5 member heterocyclic ring. Preferably, X is a hydrocarbon group, although it can contain any substituents or linkages which do not adversely affect the sultone for its intended use as a stabilizer of the adhesive composition. Another excellent class of stabilizers are the organic sulfonic acids, preferably having a molecular weight less than about 400. To be optimally useful as a stabilizer in the adhesive compositions, the sulfonic acid should have a pKA value (dissociation constant in water) of less than about 2.8, and preferably less than about 1.5.

While not essential, the cyanoacrylate adhesive compositions of this invention generally also contain an inhibitor of free radical polymerization. The most desirable of these inhibitors are of the phenolic type, such as quinone, hydroquinone, t-butyl catechol, p-methoxy phenol, etc.

The above inhibitors may be used within wide ranges, but the following general guidelines are representative of common practice, all figures being weight percent of the adhesive composition: acidic gases—from about 0.001% to about 0.06% by weight; sultones—from about 0.1% to about 10% by weight; sulfonic acids—from about 0.0005% to about 0.1% by weight; free radical inhibitors—from about 0.001% to about 1%.

Other common additives for cyanoacrylate adhesive compositions are plasticizers and thickeners. Plasticizers serve to make the cured bonds less brittle and, therefore, more durable. The most common of these plasticizers are C$_1$ to C$_{10}$ alkyl esters of dibasic acids such as sebasic acid and malonic acid. Other plasticizers, such as diaryl ethers and polyurethanes, also may be used.

Thickeners increase the viscosity of the adhesives and render them capable of greater retention on parts to be bonded, and particularly to fill larger gaps between such parts. A number of such thickeners are known for use in combination with cyanoacrylate adhesives, the most common of which are acrylate resins such as polymethylmethacrylate and polyethylmethacrylate. Other suitable thickeners include polymeric alkylcyanoacrylates, cellulose esters such as cellulose acetate and cellulose butyrate, and polyvinyl ethers such as polyvinylmethyl ether.

Compositions of this invention are prepared from the original starting materials by a conventional mixing operation, although moderate heating may be helpful to achieve solution of the ingredients within a reasonable time.

The polymerization accelerators which are used in the compositions and processes of this invention are organic sulfur containing compounds containing a

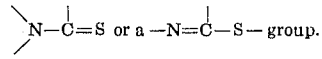

The remainder of the molecule does not seem critical for purposes of this invention, although it should be free of reactive groups which could serve as Lewis acids, since such groups could tend to inhibit cure.

Examples of three specific classes of compounds which have been found excellent for purposes of this invention are as follows.

a. N-disubstituted metallic dithiocarbamates having the general formula R$_1$R$_2$N·C·(=S)·S$_x$M$_y$ where each of R$_1$ and R$_2$, which may be the same or different, represents a saturated or an ethylenically or aromatically unsaturated group, preferably a hydrocarbon group, having a maximum of 10 carbon atoms, and R$_1$ and R$_2$ together with the nitrogen atom to which they are attached, may additionally represent a heterocyclic group having a maximum of 10 carbon atoms; M is any metal which forms dithiocarbamates, which metal is commonly any of the transition metals; and $x$ and $y$ are integers which depend in well-known manner upon the valency of the metal, and generally are from 1 to about 4.

b. N-disubstituted benzothiazole-2sulfenamides having the general formula

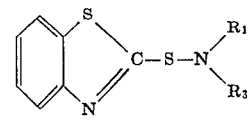

where R$_1$ is defined in (a), above, and R$_3$ is either R$_1$ or hydrogen.

(c) N,N-tetrasubstituted thiruam mono- and oligosulfides having the general formula R$_1$R$_2$N·C(=S)·S$_z$·C(=S)·NR$_1$R$_2$, where each of R$_1$ and R$_2$, which may be the same or different, has the meaning given in (a) above; z is an integer not exceeding 5.

The polymerization accelerator generally is used in a volatile organic solvent, and applied as a solution to the substrate. Any solvent capable of dissolving the polymerization accelerator and which will evaporate from a thin film at standard conditions of temperature and pressure within about one minute can be used. Examples of suitable solvents are halogenated hydrocarbons, such as methylene chloride, trichloroethylene, trichloroethane and methyl chloroform. Other solvents such as alcohols, hydrocarbons and laquer-type solvents also can be used.

The polymerization accelerator may be used within broad ranges in the solvent, e.g., 0.01% to about 20% by weight. A preferred range is from about 0.1% to about 5.0% by weight of the total mixture, and most preferably 0.1% to about 1.0% by weight.

The invention will be illustrated now by reference to the following specific examples which are not intended to limit the scope of the invention in any way.

EXAMPLE I

Two pieces of oakwood were bonded together with an adhesive composition comprising methyl 2-cyanoacrylate containing 0.5% propane sultone and 0.01% hydroquinone as stabilizers. The pieces were clamped together for 15 minutes, after which it was found that no effective bond had been formed.

The above procedure was then repeated with the following variation according to this invention. Both of the wood surfaces to be bonded were moistened with a 0.1% by weight solution of bismuth dimethyldithiocarbamate in 1,1,1-trichloroethane/chloroform (a 50/50 mixture by volume). The solvent was allowed to evaporate. The adhesive was applied to one of the surfaces, the pieces were joined and a firm bond resulted within one minute.

The first part of the above example illustrates a disadvantage of adhesive compositions of the prior art. The second part illustrates the effectiveness of a solution of bismuth dimethyldithiocarbamate in promoting the bonding of wood, when used according to the process of the present invention.

EXAMPLE II

Two pieces of oakwood were moistened with a 0.1% by weight solution of N-oxydiethylene benzothiazole 2-sulfenamide in 1,1,1-trichloroethane. The solvent was allowed to evaporate, and the adhesive of Example I was applied to one of the surfaces. The pieces were then joined together and a firm bond became established within one minute.

EXAMPLE III

Two pieces of grit blasted mild steel were bonded together with an adhesive composition comprising methyl 2-cyanoacrylate and containing 0.5% by weight propane sultone and 0.01% hydroquinone as stabilizers. After 1 minute the bond formed was found to have a tensile-shear strength of 1,200 lbs./in$^2$, when tested according to ASTM Method D 1002-64.

The above experiment was repeated with the exception that the tensile-shear strength of the bond was examined after full or ultimate cure had taken place (24 hours after assembly). The ultimate tensile-shear strength was found to be 3,600 lbs./in$^2$.

The above illustrates the normal behavior of cyanoacrylate adhesives with grit blasted mild steel. The following experiment was then carried out and demonstrated by comparison that the practice of the present invention does not result in any weakening of the ultimate bond strength attainable with cyanoacrylate adhesives.

Two pieces of grit blasted mild steel were moistened with a 0.1% by weight solution of N-oxydiethylene benzothiazole 2-sulfenamide. The solvent was allowed to evaporate, and the adhesive composition of Example I was applied to one of the surfaces. The pieces were joined and the tensile-shear strength, tested after 1 minute, was found to be 3,050 lbs./in$^2$.

The immediately preceding experiment was repeated with the exception that the tensile-shear strength was tested after a curing time of 24 hours. The ultimate tensile-shear strength was 3,600 lbs./in$^2$.

We claim:

1. A cyanoacrylate adhesive composition comprising a monomeric ester of 2-cyanoacrylic acid and, as a polymerization accelerator, an organic compound containing a

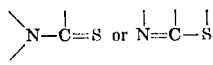

group.

2. The adhesive composition of claim 1 wherein the monomeric ester has the formula

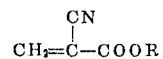

wherein R represents a $C_1-_{16}$ alkyl, cycloalkyl, alkenyl, cycloalkenyl, phenyl or heterocyclic radical; and the polymerization accelerator is an organic compound selected from the class consisting of:

a. N-disubstituted metallic dithiocarbamates having the general formula $R_1R_2N \cdot C(=S) \cdot S_x M_y$ where each of $R_1$ and $R_2$ is a saturated or an ethylenically or aromatically unsaturated hydrocarbon group containing up to about 10 carbon atoms, or where $R_1$ and $R_2$ together with the nitrogen atom to which they are attached form a heterocyclic group containing up to about 10 carbon atoms; M is a transition metal; and x and y are integers;

b. N-disubstituted benzothiazole-2-sulfenamides having the general formula

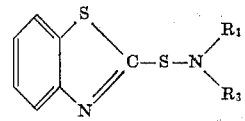

where $R_1$ is as defined above, and $R_3$ is either $R_1$ or hydrogen; and c. N,N-tetrasubstituted thiuram mono- and oligosulfides having the general formula $R_1R_2N \cdot C(=S) \cdot S_z \cdot C(=S) \cdot NR_1R_2$, where each of $R_1$ and $R_2$ is as described above; and z is an integer.

3. The adhesive composition of claim 2 wherein the monomeric ester has the formula

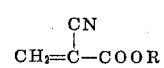

wherein R is cyclohexyl or a $C_1$ to $C_6$ alkyl or alkenyl radical.

4. The adhesive composition of claim 2 wherein the polymerization accelerator is a dithiocarbamate.

5. A two part adhesive composition consisting of:

a. an adhesive component comprising a monomeric ester of 2-cyanoacrylic acid having the formula

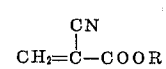

wherein R represents a $C_1-_{16}$ alkyl, cycloalkyl, alkenyl, cycloalkenyl, phenyl or heterocyclic radical; and b. an activator component comprising a polymerization accelerator selected from the class consisting of:

a. N-disubstituted metallic dithiocarbamates having the general formula $R_1R_2N \cdot C(=S) \cdot S_x M_y$ where each of $R_1$ and $R_2$ is a saturated or an ethylenically or aromatically unsaturated hydrocarbon group containing up to about 10 carbon atoms, or where $R_1$ and $R_2$ together with the nitrogen atom to which they are attached form a heterocyclic group containing up to about 10 carbon atoms; M is a transition metal; and x and y are integers;

b. N-disubstituted benzothiazone-2-sulfenamides having the general formula

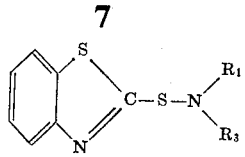

where $R_1$ is as defined above, and $R_3$ is either $R_1$ or hydrogen; and c. N,N-tetrasubstituted thiuram mono- and oligosulfides having the general formula $R_1R_2N \cdot C(=S) \cdot S_z \cdot C(=S) \cdot NR_1R_2$, where each of $R_1$ and $R_2$ is as described above; and z is an integer.

6. The adhesive composition of claim 5 wherein the adhesive component additionally contains an inhibitor of anionic polymerization.

7. The adhesive composition of claim 6 wherein the polymerization accelerator is dissolved in a volatile organic solvent, and comprises from about 0.01% to about 20% by weight of the mixture of solvent and polymerization accelerator.

8. The process for bonding two substrates which comprises (a) applying to at least one of said substrates a solvent solution of a polymerization acceleration selected from the class consisting of:

a. N-disubstituted metallic dithiocarbamates having the general formula $R_1R_2N \cdot C \cdot (=S) \cdot S_x m_y$ where each of $R_1$ and $R_2$ is a saturated or an ethylenically or aromatically unsaturated hydrocarbon group containing up to about 10 carbon atoms, or where $R_1$ and $R_2$ together with the nitrogen atom to which they are attached form a heterocyclic group containing up to about 10 carbon atoms; M is a transition metal; and x and y are integers;

b. N-disubstituted benzothiazole-2-sulfenamides having the general formula

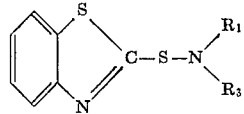

where $R_1$ is as defined above, and $R_3$ is either $R_1$ or hydrogen; and c. N,N-tetrasubstituted thiuram mono- and oligosulfides having the general formula $R_1R_2N \cdot C(=S) \cdot S_z \cdot C(=S) \cdot NR_1R_2$, where each of $R_1$ and $R_2$ is as described above; and z is an integer; (b) applying to at least one of said substrates an adhesive comprising a monomeric ester having the formula

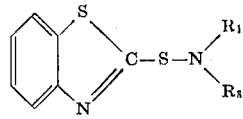

wherein R represents a $C_1-_{16}$ alkyl, cycloalkyl, alkenyl, cycloalkenyl, phenyl or heterocyclic radical; and (c) placing the substrates of steps (a) and (b) in contacting relationship until the adhesive has hardened to form an adhesive bond therebetween.

9. The process of claim 8 wherein the polymerization accelerator comprises from about 0.1% to about 5.0% by weight of the solvent solution, and the adhesive comprises a monomeric ester having the formula

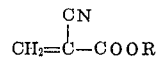

wherein R is cyclohexyl or a $C_1$ to $C_6$ alkyl or alkenyl radical.

10. The process of claim 9 wherein the adhesive additionally contains an inhibitor of anionic polymerization.

11. The process of claim 8 wherein each of x and y are integers between 1 and about 4, and z is an integer not exceeding about 5; and the adhesive additionally contains an inhibitor of anionic polymerization.

12. The process of claim 11 wherein the inhibitor of anionic polymerization is selected from the class consisting of acidic gasses, organic sultones, and organic sulfonic acids.

* * * * *